(12) United States Patent
Shyu

(10) Patent No.: US 7,580,105 B2
(45) Date of Patent: Aug. 25, 2009

(54) LIQUID CRYSTAL DISPLAY DEVICES

(75) Inventor: Wen-Yih Shyu, Tao Yuan Shien (TW)

(73) Assignee: Au Optronics Corp., Hsinchu (TW)

( * ) Notice: Subject to any disclaimer, the term of this patent is extended or adjusted under 35 U.S.C. 154(b) by 330 days.

(21) Appl. No.: 11/419,215

(22) Filed: May 19, 2006

(65) Prior Publication Data

US 2007/0146619 A1     Jun. 28, 2007

(30) Foreign Application Priority Data

Dec. 27, 2005     (TW) ............................... 94146694 A

(51) Int. Cl.
    *G02F 1/1339*     (2006.01)
(52) U.S. Cl. .................. 349/155; 349/153; 349/156
(58) Field of Classification Search .................. 349/153, 349/155, 156
    See application file for complete search history.

(56) References Cited

U.S. PATENT DOCUMENTS

2003/0128327 A1*   7/2003  Noiri .......................... 349/156

2006/0103803 A1    5/2006  Jeon et al.

FOREIGN PATENT DOCUMENTS

CN            1672088       9/2005
WO       WO 2004/013686    2/2004

OTHER PUBLICATIONS

CN Office Action mailed Jul. 13, 2007.

* cited by examiner

*Primary Examiner*—David Nelms
*Assistant Examiner*—David Y Chung
(74) *Attorney, Agent, or Firm*—Thomas, Kayden, Horstemeyer & Risley

(57)     ABSTRACT

Liquid crystal display (LCD) device with continuous isolation wall structures dividing a plurality of regions is provided. The LCD device includes a first substrate with an array of a plurality of pixel regions thereon. A second substrate parallel and opposing the first substrate with a gap therebetween is also provided. A liquid crystal layer is interposed between the first substrate and the second substrate, wherein the array is divided into a plurality of sub-regions, and each sub-region comprises a plurality of pixel regions.

24 Claims, 5 Drawing Sheets

LIQUID CRYSTAL DISPLAY DEVICES

BACKGROUND OF THE INVENTION

1. Field of the Invention

The present invention relates to liquid crystal display (LCD) devices, and in particular to LCD devices with continuous insulation wall structures.

2. Description of the Related Art

Liquid crystal display (LCD) devices have many advantages such as small volume, light weight and low power consumption, and are applicable in a variety of electronic and communication devices including notebook computers, personal digital assistants (PDA), mobile phones and the like. From a fabrication point of view, LCD devices formed by one drop filling (ODF) methods can reduce liquid crystal fill time, and have therefore become main stream methods for fabricating LCD devices.

FIG. 1 is a cross section of a conventional liquid crystal display device. A liquid crystal display device 100 includes a first substrate 10, a second substrate 50, and a liquid crystal layer 70 interposed therebetween. The LCD device 100 further includes a plurality of pixel regions P defined by the intersection of gate lines (not shown) and data lines 26. Each pixel region P comprises a region with an active device T such as a thin film transistor (TFT) and a pixel electrode 32. The thin film transistor comprises a gate 12 electrically connecting the gate line (not shown), a semiconductor layer 20 formed on the gate 12, a source 22 formed on the semiconductor layer 20 connecting the data line 26 and separating from drain 24 by a specific distance.

A first insulation layer 14 and a second insulation layer 28 are formed over the first substrate 10. A black matrix (BM) 52 is formed over the inner surface of the second substrate 50 opposing the first substrate 10. The black matrix 52 is positioned corresponding to the region with active devices T, gate line (not shown), and scan line 26.

The second substrate 50 further comprises color filters 54 on the black matrix 52. The color filters 54 can be further divided into three color regions such as red (R) 54a, green (G) 54b, and blue (B) 54c. Each color region is positioned corresponding to a pixel region P. A passivation layer 56 and a transparent common electrode 58 are sequentially formed over the inner surface of the second substrate 50. Both the first substrate 10 and second substrate 50 comprise an alignment layer over the inner surface. Spacers 60 are disposed in the liquid crystal layer to maintain a gap between the opposing substrates.

In general, a typical LCD device requires two parallel substrates with a highly precise gap therebetween. Two substrates 10 and 50 are aligned and assembled with a cavity therebetween. Next, liquid crystal 70 is filled into the cavity by vacuum injection, and the cavity is sealed, completing large scale panel devices using vacuum injection, however, is inefficient and lengthy.

In order to improve liquid crystal injection efficiency, a method of one drop filling (ODF) is proposed. After a frame is formed on a flange of a substrate, liquid crystal is directly dripped in the frame region of the substrate. An opposing substrate is subsequently assembled on the substrate. The ODF method, however, usually results in inadequate or excessive liquid crystal being filled, thereby leading to irregular display (mura defects). Moreover, when a large scale TFT-LCD is set upright, distribution of the liquid crystal becomes unbalanced due to gravity causing mura defects. A novel LCD structure is thus required to prevent unbalanced LC distribution and ameliorate mura defects.

U.S. Publication No. 2004/0263766, the entirety of which is hereby incorporated by reference, discloses a liquid crystal display device as shown in FIG. 2. In FIG. 2, each red (R), green (G) and blue (B) pixel is surrounded by a continuous protruding wall 108 to serve as spacers. Spacers can prevent unbalanced liquid crystal due to gravity. The continuous protruding wall 108 is disposed on the black matrix 102. The continuous protruding wall 108, however, may cause isolation of liquid crystal between adjacent pixel regions, and cause further assembly difficulties.

BRIEF SUMMARY OF THE INVENTION

A detailed description is given in the following embodiments with reference to the accompanying drawings.

The invention is directed to a novel LCD cell structure for an LCD device, which is divided into a plurality of sub-regions. A continuous isolation wall structure is formed surrounding each sub-region to prevent unbalanced liquid crystal distribution.

In one aspect of the invention, a liquid crystal display device comprises a first substrate with an array of a plurality of pixel regions thereon, a second substrate parallel and opposing the first substrate with a gap therebetween, and a liquid crystal layer interposed between the first substrate and the second substrate, wherein the array is divided into a plurality of sub-regions, and each sub-region comprises a plurality of pixel regions.

In another aspect of the invention, a liquid crystal display device comprises a first substrate with an array of a plurality of pixel regions thereon, wherein the array is divided into a plurality of sub-regions, and each sub-region comprises a plurality of pixel regions, a plurality of color filters disposed on the first substrate, a second substrate parallel and opposing the first substrate with a gap therebetween, a liquid crystal layer interposed between the first substrate and the second substrate, and a continuous insulation wall structure surrounding the plurality of sub-regions.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention, illustrated by a large scale TFT-LCD panel, is direct to a liquid crystal display device comprising a display region and a non-display region. The display region is divided into a plurality of sub-regions. Each sub-region is surrounded by a continuous insulation wall structure to prevent uneven cell gaps and liquid crystal redistribution due to gravity.

Figure 1:
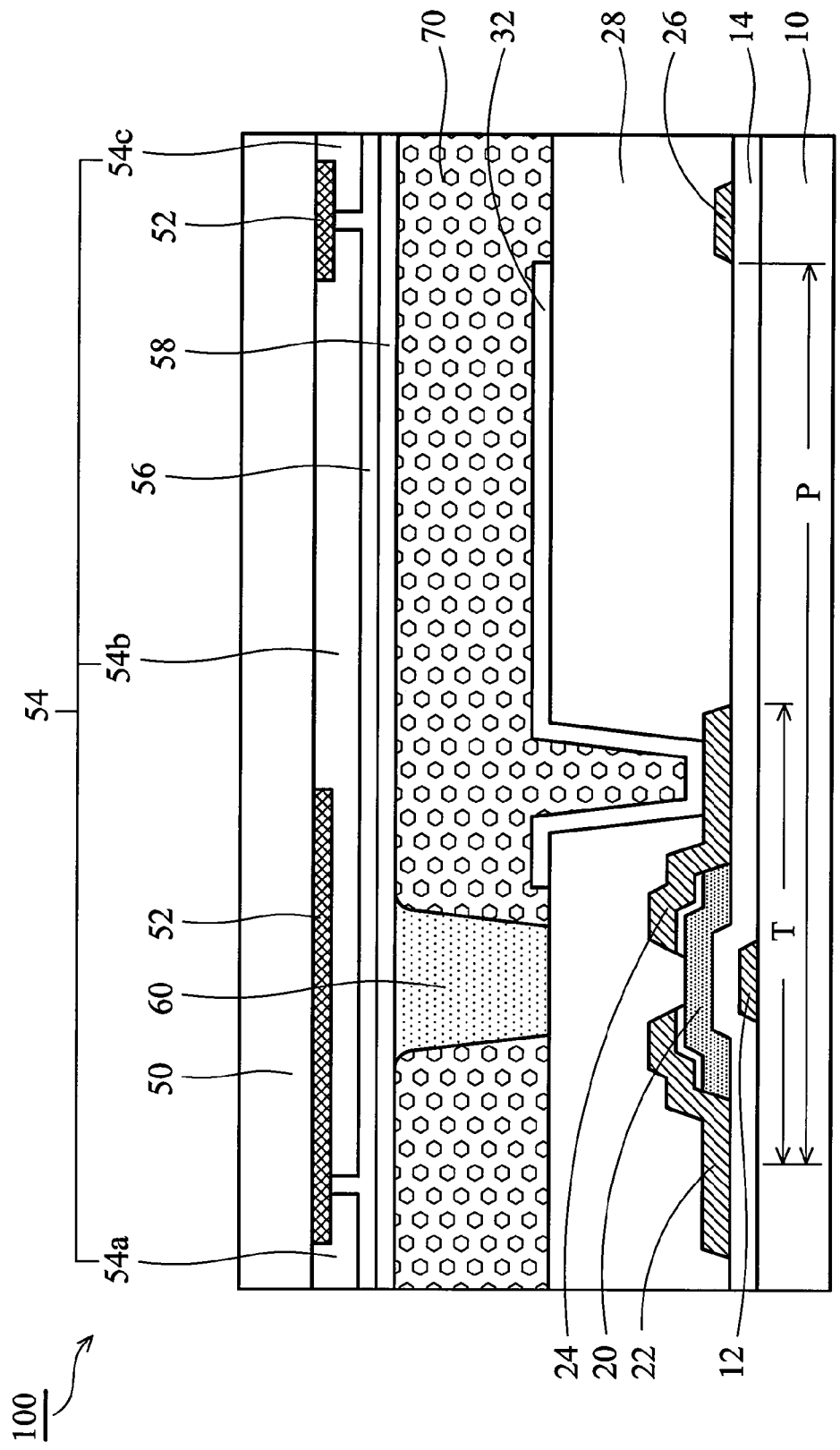
FIG. 1 is a cross section of a conventional liquid crystal display device.
Figure 2:
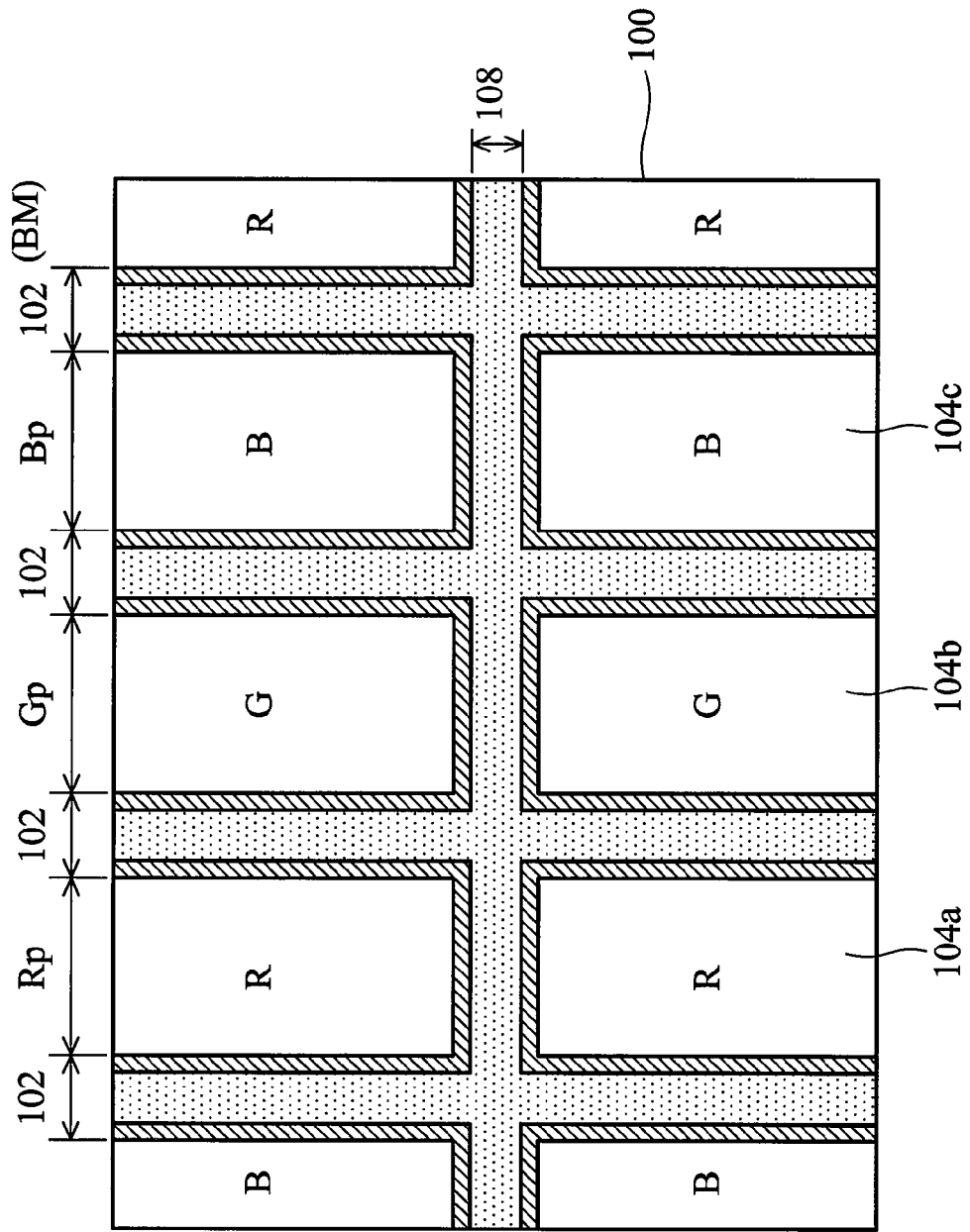
FIG. 2 is schematic view of a conventional continuous wall structure surrounding each red (R), green (G), and blue (B) pixel of a liquid crystal display device.
Figure 3:
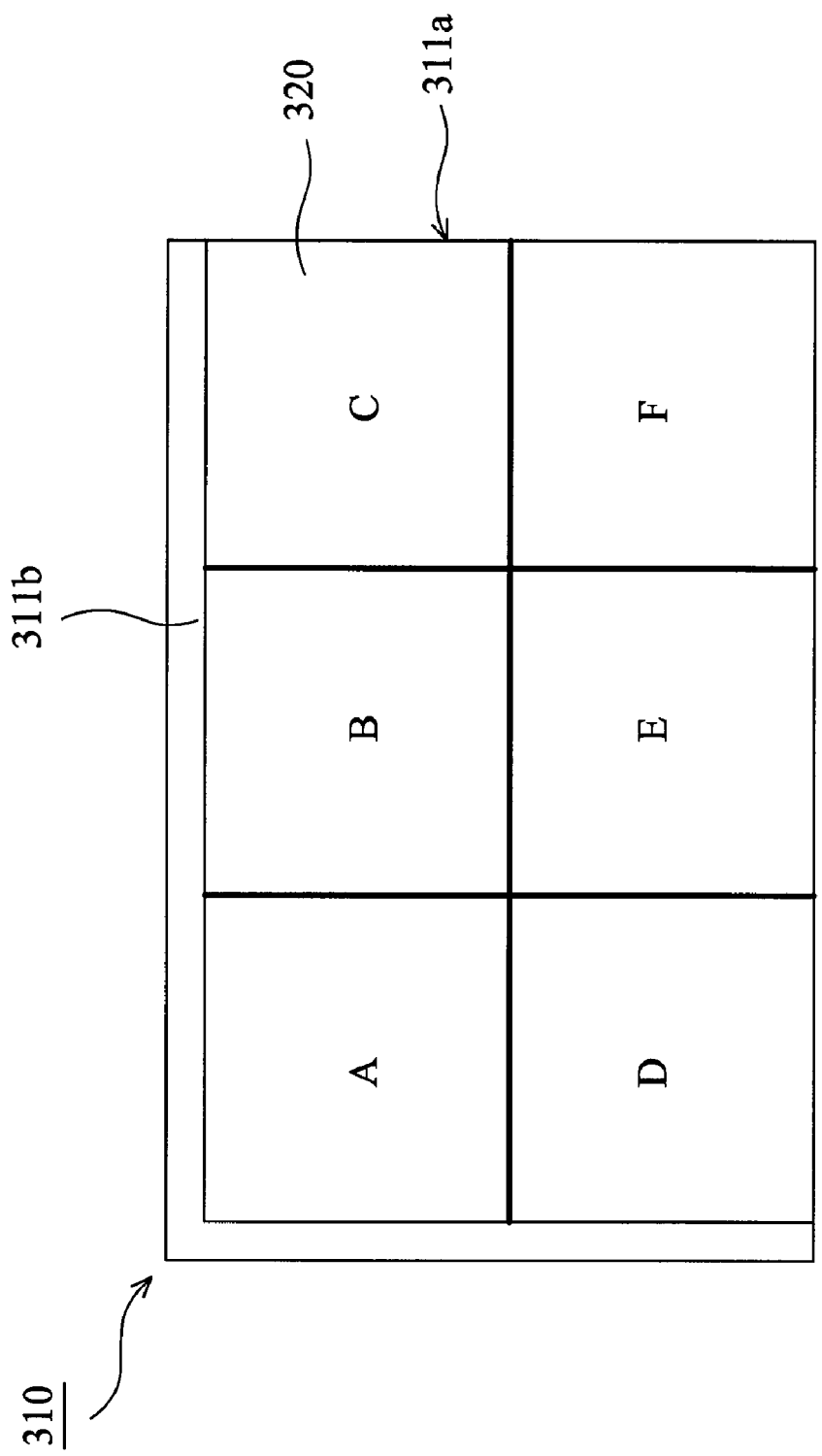
FIG. 3 is a schematic plan view of a liquid crystal device according to an embodiment of the invention.

FIG. 3 is a schematic plan view of a liquid crystal device according to an embodiment of the invention. In FIG. 3, a large scale liquid crystal display device 300 includes a color filter substrate 310 with a display region 311a and a non-display region 311b. The display region 311a is divided into a plurality of sub-regions 320 such as sub-regions A-F. The dimension of the sub-regions 320 is approximately in a range of 5-15 inches and comprises a plurality of pixels P. Each sub-region can be square or rectangular, or depending on arrangements of pixels and color filters. The arrangements of pixels and color filters can be striped, mosaic, or honeycomb shapes.

Although the invention is illustrated by color filter substrate 310, it is, however, not limited thereto. According to another aspect of the invention, a color filter on array (COA) substrate is also applicable.

Figure 4:
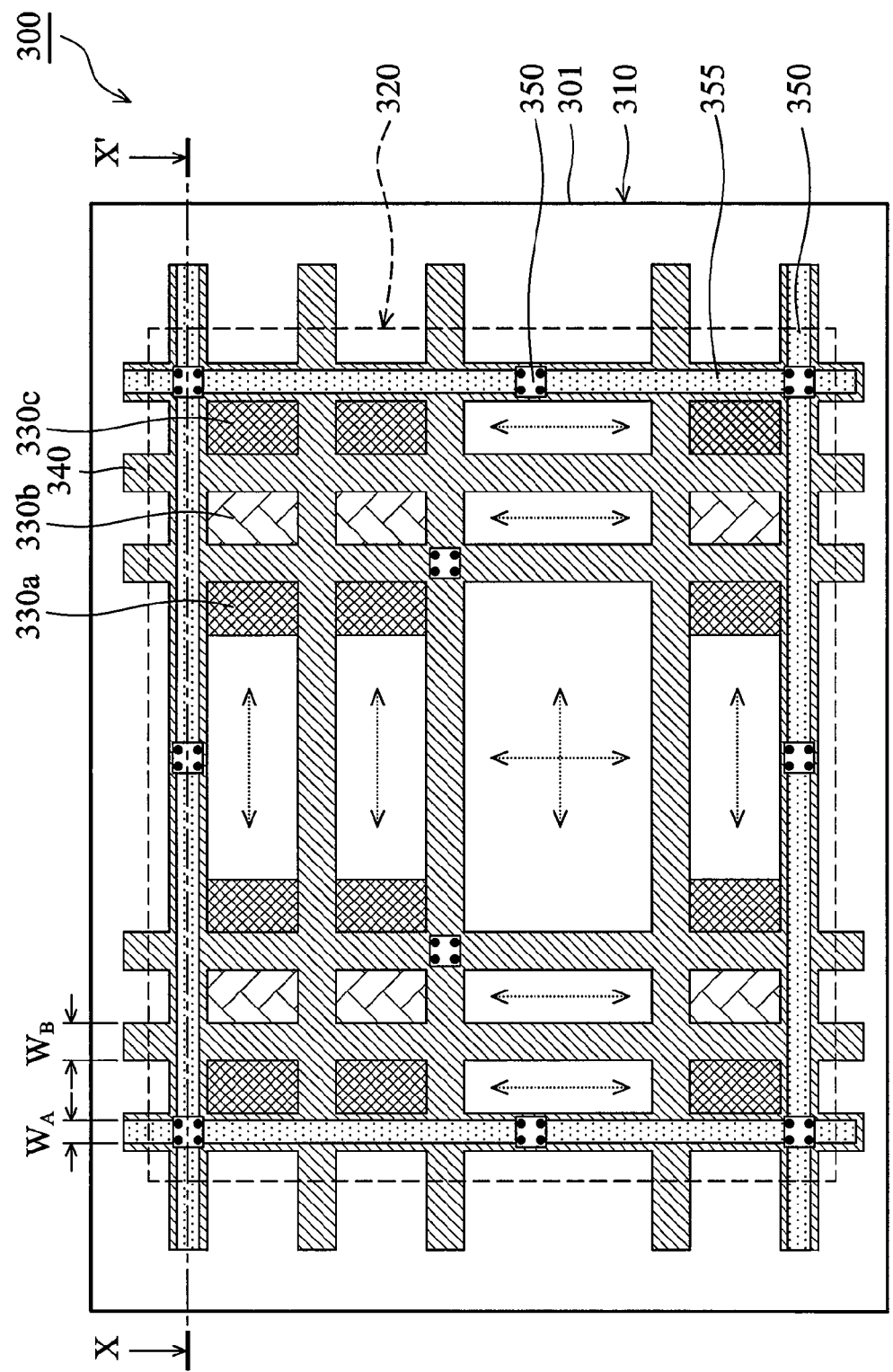
FIG. 4 is a schematic view of a sub-region 320 of a color filter substrate 310 in FIG. 3.

FIG. 4 is a schematic view of a sub-region 320 of a color filter substrate 310 in FIG. 3. Referring to FIG. 4, the color filter substrate 310 is divided into a plurality of sub-regions 320 such as sub-regions A-F. One sub-region, such as region A, comprises a transparent substrate 301, such as a glass substrate or a plastic substrate. A black matrix 340 is formed on the transparent substrate 301. The black matrix 340 can be formed on an opaque region along the periphery or boundary of each pixel region P corresponding to active devices, gate lines and data lines.

Color filters 330 including red (R) 330a, green (G) 330b, and blue (B) 330c are disposed on each pixel region P of the sub-region 320 surrounded by continuous isolation wall structures 355. Note that continuous isolation wall structures 355 are not limited to being disposed on the black matrix, and can be disposed on other opaque regions such as gate lines and data lines. A passivation layer and a transparent common electrode are sequentially formed on the color filter substrate.

Subsequently, spacers 350 are formed on the black matrix 340. The spacers 350 can provide a uniform and balanced gap between opposing substrates. The spacers 350 can be columnar spacer structures formed by lithography and etching.

To prevent mura defects in large scale LCD devices due to gravity, the invention provides a continuous isolation wall structure 355 surrounding each sub-region 320. The continuous isolation wall structure 355 and spacers 350 can be formed in the same lithographical etching steps. Alternatively, the continuous isolation wall structure 355 and spacers 350 can be formed separately in different lithographical etching steps. The continuous isolation wall structure 355 is preferably disposed along the black matrix 340. The width $W_A$ of the continuous isolation wall structure 355 is less than the width $W_B$ of the spacers 320. The height h of the continuous isolation wall structure 355 is less than the height H of the spacers 320, preferably in a range of ⅓-¼ of the height of the black matrix H.

Figure 5:
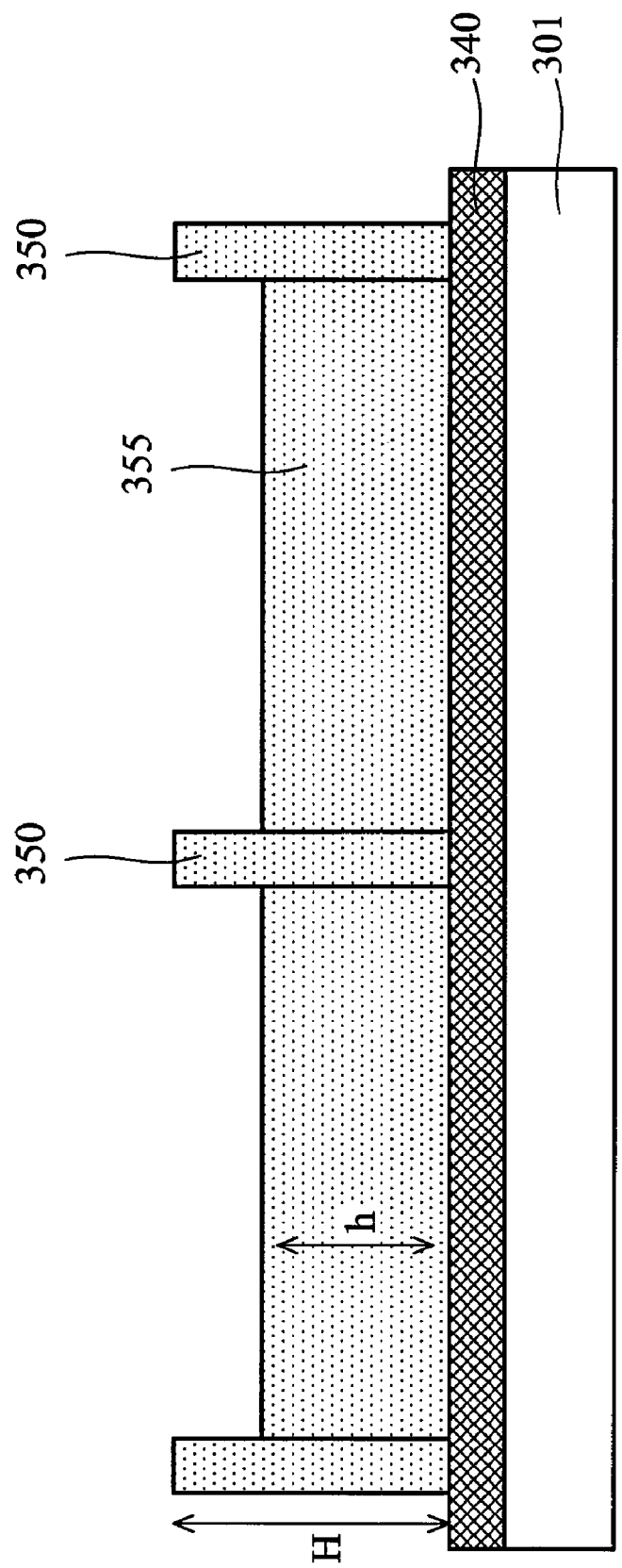
FIG. 5 is a cross section of the continuous wall structure taken along line X-X of FIG. 4.

It should be understood that the height of the continuous isolation wall structure depends on the viscosity of the liquid crystal. If the viscosity of the liquid crystal is high, a lower continuous isolation wall structure 355 is required. On the contrary, a higher continuous isolation wall structure 355 is required when the viscosity of liquid crystal is high. FIG. 5 is a cross section of the continuous isolation wall structure taken along line X-X of FIG. 4.

According another embodiment of the invention, the color filters can be alternatively formed on the active matrix substrate. The black matrix 340 is formed on an opaque region corresponding to active devices, gate lines and data lines. Color filters including red (R), green (G), and blue (B) are disposed on each pixel P of the sub-region 320 surrounded by wall isolation structures 355. Note that the wall isolation structures 355 are not limited to being disposed on the black matrix, and can be disposed on other opaque regions such as gate lines and data lines. A passivation layer and a transparent pixel electrode are sequentially formed on the active matrix substrate.

Accordingly, the invention provides a large scale LCD device comprising a first substrate and a second substrate parallel and opposing the first substrate with spacers providing a uniform and balanced gap therebetween. A plurality of color filters are formed on the first substrate corresponding to pixel regions. A liquid crystal layer formed by one-drop filling (ODF) is interposed between the first substrate and the second substrate. The large scale LCD device further comprises a display region 311a and a non-display region 311b. The display region 311a is divided into a plurality of sub-regions, and each sub-region is surrounded by continuous isolation wall structures, wherein the height of each continuous isolation wall structure is less than the height of the spacers.

The invention is advantageous in that by dividing a large scale LCD into a plurality of sub-regions surrounded by a continuous isolation wall structure prevents the effect of gravity on the liquid crystal thereby ameliorating mura defects While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display device, comprising:
   a first substrate with an array of a plurality of pixel regions thereon;
   a second substrate parallel and opposing the first substrate with a gap therebetween; and
   a liquid crystal layer interposed between the first substrate and the second substrate,
   wherein the array is divided into a plurality of sub-regions, and each sub-region comprises a plurality of pixel regions;
   wherein each of the plurality of sub-regions is surrounded by an insulation wall structure; and
   wherein a plurality of spacers are interposed between the first substrate and the second substrate, and the height of the spacers exceeds the height of the insulation wall structure.

2. The liquid crystal display device as claimed in claim 1, further comprising a plurality of color filters disposed on the first substrate.

3. The liquid crystal display device as claimed in claim 2, further comprising a black matrix disposed on a peripheral region of each color filter layer.

4. The liquid crystal display device as claimed in claim 1, further comprising an array of active devices on the first substrate.

5. The liquid crystal display device as claimed in claim 4, wherein the array of active devices is composed of a plurality of gate lines and a plurality of data lines.

6. The liquid crystal display device as claimed in claim 1, wherein a height of the continuous insulation wall structure is approximately ⅓-⅘ of the height of the plurality of spacers.

7. The liquid crystal display device as claimed in claim 1, wherein the insulation wall structure is disposed on a black matrix between each color filter layer.

8. The liquid crystal display device as claimed in claim 1, wherein the continuous insulation wall structure is disposed on the gate lines and the data lines of the array of the active devices.

9. The liquid crystal display device as claimed in claim 1, wherein the dimensions of the sub-regions is approximately in a range of 5-15 inches.

10. The liquid crystal display device as claimed in claim 1, wherein the liquid crystal layer is formed by a one-drop filling (ODF) method.

11. A liquid crystal display device, comprising:
a first substrate with an array of a plurality of pixel regions thereon, wherein the array is divided into a plurality of sub-regions, and each sub-region comprises a plurality of pixel regions;
a second substrate parallel and opposing the first substrate with a gap therebetween;
a liquid crystal layer interposed between the first substrate and the second substrate; and
a continuous insulation wall structure surrounding the plurality of sub-regions,
wherein both sides of the continuous insulation wall structure directly contact with the liquid crystal layer, and
wherein a plurality of spacers are interposed between the first substrate and the second substrate, and the height of the spacers exceeds the height of the insulation wall structure.

12. The liquid crystal display device as claimed in claim 11, further comprising a black matrix disposed on a peripheral region of each color filter layer.

13. The liquid crystal display device as claimed in claim 11, wherein a height of the continuous insulation wall structure is approximately $1/3$-$4/5$ of the height of the plurality of spacers.

14. The liquid crystal display device as claimed in claim 11, wherein the continuous insulation wall structure is disposed on a black matrix.

15. The liquid crystal display device as claimed in claim 11, wherein the dimensions of the sub-regions is approximately in a range of 5-15 inches.

16. The liquid crystal display device as claimed in claim 11, wherein the liquid crystal layer is formed by a one-drop filling (ODF) method.

17. A liquid crystal display device, comprising:
a first substrate with an array of a plurality of pixel regions thereon, wherein the array is divided into a plurality of sub-regions, and each sub-region comprises a plurality of pixel regions;
a second substrate parallel and opposing the first substrate with a gap therebetween;
a liquid crystal layer interposed between the first substrate and the second substrate; and
a continuous insulation wall structure surrounding the plurality of sub-regions,
wherein a plurality of spacers are interposed between the first substrate and the second substrate, and the height of the spacers exceeds the height of the insulation wall structure, and
wherein each sub-region comprises a plurality of spacers.

18. The liquid crystal display device as claimed in claim 17, further comprising a black matrix disposed on a peripheral region of each color filter layer.

19. The liquid crystal display device as claimed in claim 17, wherein a height of the continuous insulation wall structure is approximately $1/3$-$4/5$ of the height of the plurality of spacers.

20. The liquid crystal display device as claimed in claim 17, wherein the continuous insulation wall structure is disposed on a black matrix.

21. The liquid crystal display device as claimed in claim 17, wherein the dimensions of the sub-regions is approximately in a range of 5-15 inches.

22. The liquid crystal display device as claimed in claim 17, wherein the liquid crystal layer is formed by a one-drop filling (ODF) method.

23. The liquid crystal display device as claimed in claim 17, further comprising a plurality of color filters disposed on the first substrate.

24. The liquid crystal display device as claimed in claim 11, further comprising a plurality of color filters disposed on the first substrate.

* * * * *